US007396609B2

United States Patent
Sugita et al.

(10) Patent No.: US 7,396,609 B2
(45) Date of Patent: Jul. 8, 2008

(54) FUEL CELL AND METAL SEPARATOR FOR FUEL CELL

(75) Inventors: Narutoshi Sugita, Utsunomiya (JP); Daisuke Okonogi, Shioya-gun (JP); Mikihiko Kimura, Gyoda (JP); Shuhei Goto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 216 days.

(21) Appl. No.: 11/090,341

(22) Filed: Mar. 25, 2005

(65) Prior Publication Data
US 2005/0271926 A1    Dec. 8, 2005

(30) Foreign Application Priority Data
Mar. 25, 2004    (JP)    ............... 2004-088599

(51) Int. Cl.
*H01M 2/00*    (2006.01)
(52) U.S. Cl. ............... 429/34; 429/35; 429/36
(58) Field of Classification Search ............ 429/34, 429/35, 36, 37, 38
See application file for complete search history.

(56) References Cited

U.S. PATENT DOCUMENTS 6,153,326 A * 11/2000 Matsukawa et al. ........... 429/34
2003/0124406 A1* 7/2003 Ohtani et al. ................. 429/34

FOREIGN PATENT DOCUMENTS

| JP | 11-129396 | 5/1999 |
|----|-----------|--------|
| JP | 11-309746 | 11/1999 |

* cited by examiner

*Primary Examiner*—Patrick Ryan
*Assistant Examiner*—Ben Lewis
(74) *Attorney, Agent, or Firm*—Lahive & Cockfield, LLP; Anthony A. Laurentano, Esq.

(57) ABSTRACT

A power generation cell includes a membrane electrode assembly and first and second metal separators sandwiching the membrane electrode assembly. The first metal separator is a thin metal plate. A first seal member is formed integrally around the outer end of the first metal separator. A portion defining an orifice is provided in an outer marginal region of the first metal separator. The thickness H1 of the first seal member in the area covering the portion defining the orifice is larger than the thickness of the H2 of the first seal member in the area covering other portions.

4 Claims, 7 Drawing Sheets

FUEL CELL AND METAL SEPARATOR FOR FUEL CELL

BACKGROUND OF THE INVENTION

1. Field of the Invention

The present invention relates to a fuel cell formed by stacking a metal separator and a membrane electrode assembly including a pair of electrodes and an electrolyte membrane interposed between the electrodes. Further, the present invention relates to a metal separator for the fuel cell.

2. Description of the Related Art

For example, a solid polymer electrolyte fuel cell employs a polymer ion exchange membrane as a solid polymer electrolyte membrane. The solid polymer electrolyte membrane is interposed between an anode and a cathode to form a membrane electrode assembly. Each of the anode and the cathode is made of electrode catalyst and porous carbon. The membrane electrode assembly is sandwiched between separators (bipolar plates) to form the fuel cell. In use, generally, a predetermined number of the fuel cells are stacked together to form a fuel cell stack.

In the fuel cell, a fuel gas such as a gas chiefly containing hydrogen (hereinafter also referred to as the hydrogen-containing gas) is supplied to the anode. An oxidizing gas such as a gas chiefly containing oxygen (hereinafter also referred to as the oxygen-containing gas) is supplied to the cathode. The catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode, creating a DC electrical energy.

In the fuel cell, for example, a metal plate is used for fabricating the separator. The strength of the metal separator is high in comparison with a carbon separator, and the metal plate is suitable for fabricating a thin separator. The metal separator, which defines reactant gas flow fields having the desired shape, is fabricated by press forming in order to reduce the thickness of the metal separator, and reduce the overall size and weight of the fuel cell.

A resin seal is provided on the metal separator for electrical insulation and sealing. For example, in a production method disclosed in Japanese Laid-Open Patent Publication No. 11-309746, as shown in FIG. 7, a thin metal plate 3 is supported between surfaces of a fixed die plate 2a and a movable die plate 2b of an injection molding die 1. In a mold cavity, a resin channel 4 is formed in a marginal region of the thin metal plate 3, i.e., a cross sectional part 3a.

Liquid silicone resin 6 is injected into the mold cavity from a gate 5 of the thin metal plate 3 to form a silicone resin layer 7 which covers the marginal region on both surfaces of the thin metal plate 3.

Normally, the thin metal plate 3 has a corrugated surface defining the reactant gas flow field and an orifice in the outer marginal region for improving the rigidity. The corrugated surface and the orifice are fabricated by press forming. In these portions, dimensional variation is likely to occur at the time of fabrication. Thus, for example, when the silicone resin layer 7 is formed integrally on the thin metal plate 3, the position of the orifice may be deviated from the position of the silicone resin layer 7 due to dimensional variation, and the metal portion around the orifice may be exposed to the outside to cause insulation failure. Consequently, the yield rate of the metal separator is lowered. In this case, the production cost is high, and the metal separator is not produced economically.

SUMMARY OF THE INVENTION

A main object of the present invention is to provide a fuel cell and a metal separator for the fuel cell in which, with simple and economical structure, it is possible to reliably prevent insulation failure of the metal separator and maintain the desired power generation performance.

According to the present invention, a fuel cell is formed by stacking a membrane electrode assembly and a metal separator. The membrane electrode assembly includes a pair of electrodes and an electrolyte membrane interposed between the electrodes. The metal separator comprises a metal plate including an outer curved portion or an outer bent portion formed by metal forming, and a seal member covering at least one plate surface of the metal plate. The thickness of the seal member in an area covering the outer curved portion or the outer bent portion of the metal plate is larger than the thickness of the seal member in an area covering other portions of the metal plate.

It is preferable that the seal member covers an end of the metal plate, and the thickness of the seal member in the area covering the end of the metal plate is larger than the thickness of the seal member in the area covering the other portions of the metal plate.

According to the present invention, the outer curved portion or the outer bent portion of the metal plate is covered by the thick area of the seal member. Therefore, even if dimensional variation occurs at the time of fabricating the metal plate by press forming, the metal portion is not exposed to the outside undesirably. Thus, with the simple and economical structure, insulation failure of the metal separator is prevented, and the desired power generation performance is maintained.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
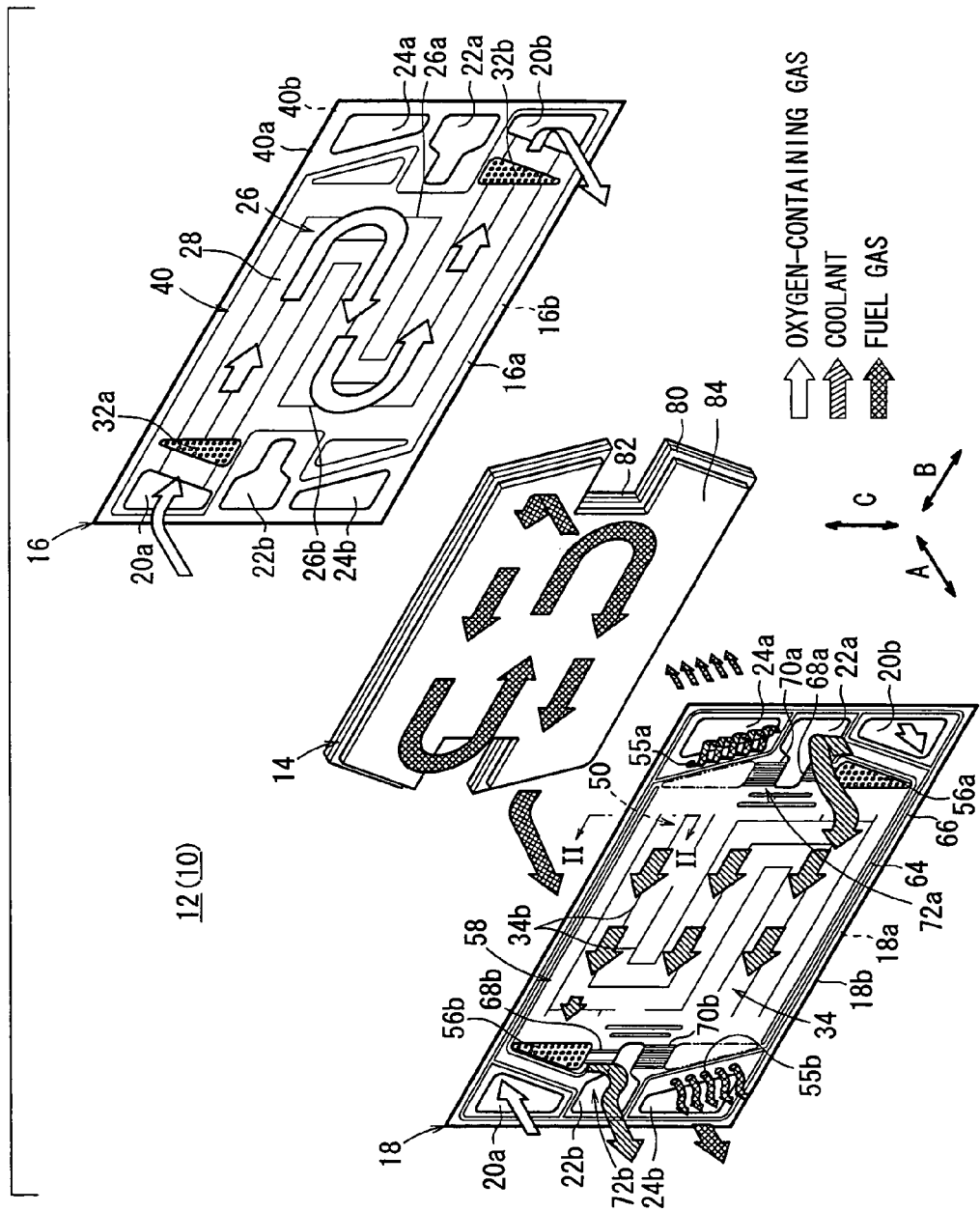
FIG. 1 is an exploded perspective view showing main components of a power generation cell of a fuel cell according to an embodiment of the present invention.
Figure 2:
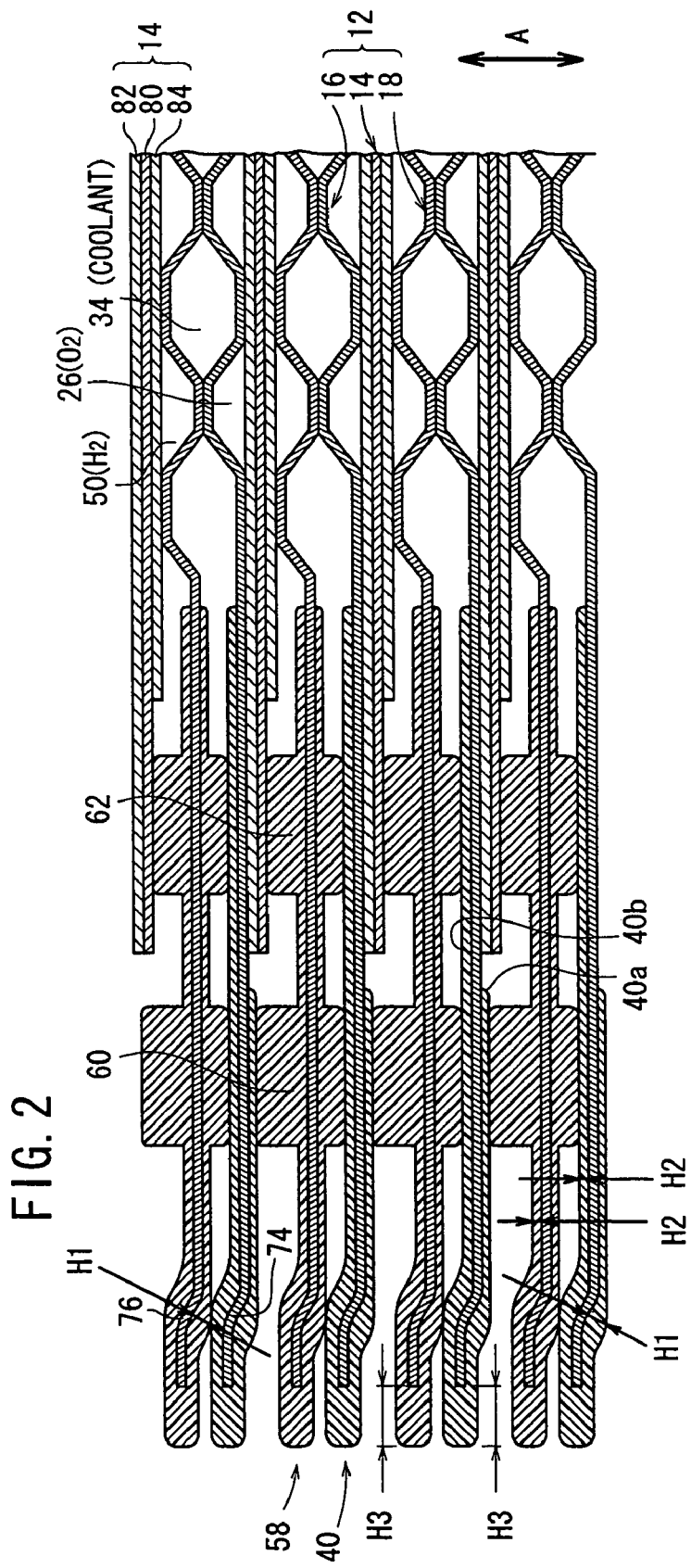
FIG. 2 is a cross sectional view showing the fuel cell, taken along a line II-II in FIG. 1.

FIG. 1 is an exploded perspective view showing main components of a power generation cell 12 of a fuel cell 10 according to an embodiment of the present invention. FIG. 2 is a cross sectional view showing the fuel cell 10 formed by stacking a plurality of the power generation cells 12 in a horizontal direction indicated by an arrow A, taken along a line II-II in FIG. 1.

As shown in FIG. 1, the power generation cell 12 includes a membrane electrode assembly 14 and first and second metal separators 16, 18 sandwiching the membrane electrode assembly 14. The first and second metal separators 16, 18 are thin metal plates such as steel plates, stainless steel plates, aluminum plates, or plated steel sheets.

At one end of the power generation cell 12 in a horizontal direction indicated by an arrow B in FIG. 1, an oxygen-containing gas supply passage 20a for supplying an oxygen-containing gas, a coolant discharge passage 22b for discharging a coolant, and a fuel gas discharge passage 24b for discharging a fuel gas such as a hydrogen-containing gas are arranged vertically in a direction indicated by an arrow C. The oxygen-containing gas supply passage 20a, the coolant discharge passage 22b, and the fuel gas discharge passage 24b extend through the power generation cell 12 in the direction indicated by the arrow A.

At the other end of the power generation cell 12 in the direction indicated by the arrow B, a fuel gas supply passage 24a for supplying the fuel gas, a coolant supply passage 22a for supplying the coolant, and an oxygen-containing gas discharge passage 20b for discharging the oxygen-containing gas are arranged in the direction indicated by the arrow C. The fuel gas supply passage 24a, the coolant supply passage 22a, and the oxygen-containing gas discharge passage 20b extend through the power generation cell 12 in the direction indicated by the arrow A.

The first metal separator 16 has an oxygen-containing gas flow field 26 on its surface 16a facing the membrane electrode assembly 14. The first metal separator 16 is corrugated to define a plurality of grooves 28 of the oxygen-containing gas flow field 26. The grooves 28 extend in a serpentine pattern having, e.g., two turn regions and three straight regions for allowing the oxygen-containing gas to flow back and forth in the direction indicated by the arrow B, and flow in the direction indicated by the arrow C. The oxygen-containing gas flow field 26 is connected to the oxygen-containing gas supply passage 20a through an inlet buffer 32a, and connected to the oxygen-containing gas discharge passage 20b through an outlet buffer 32b. For example, the inlet buffer 32a and the outlet buffer 32b include bosses or dimples, respectively.

Figure 3:
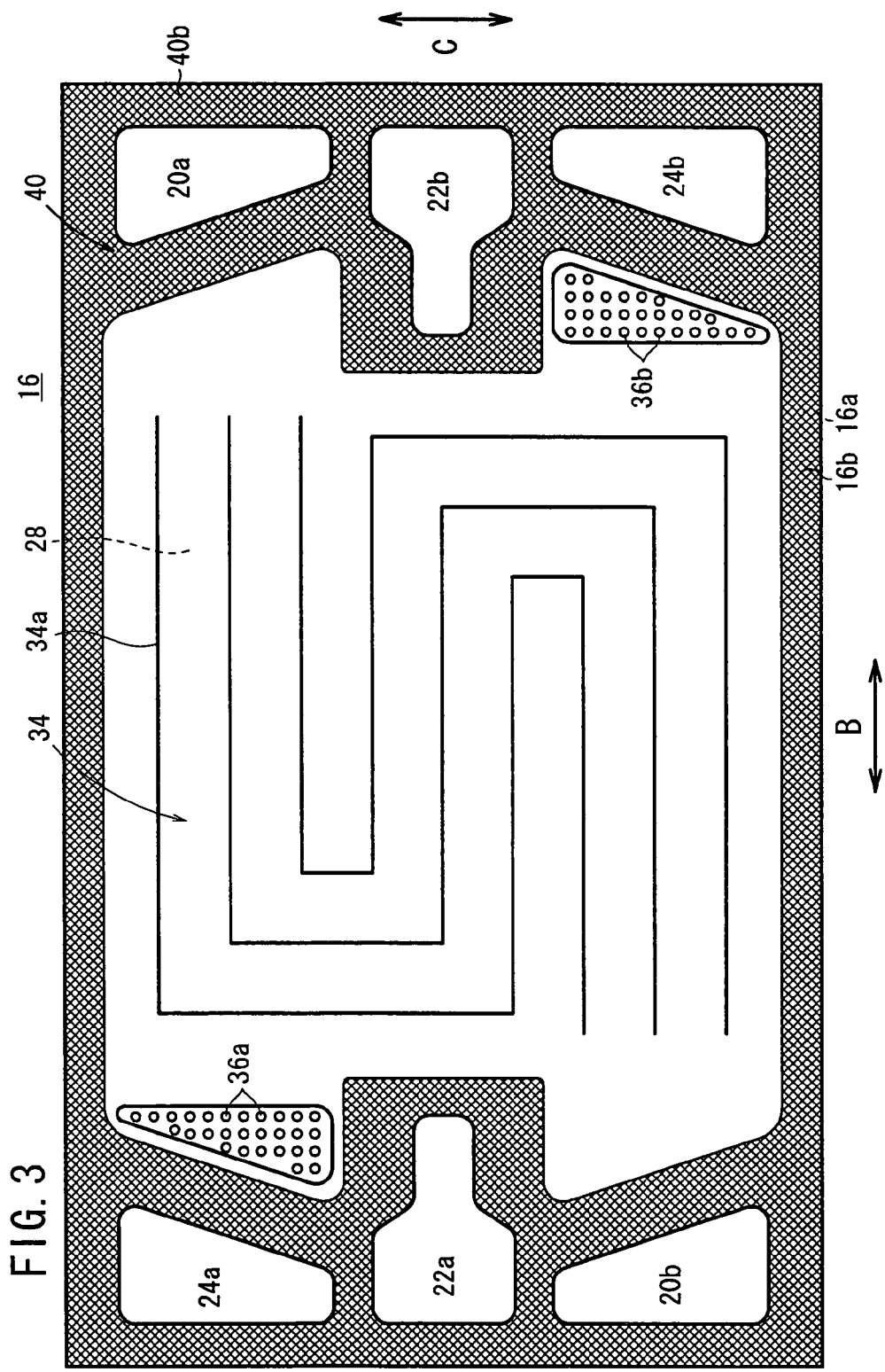
FIG. 3 is a front view showing a first metal separator of the power generation cell.

As shown in FIG. 3, a plurality of grooves 34a as part of a coolant flow field 34 are formed on the other surface 16b of the first metal separator 16. The shape of the grooves 34a of the coolant flow field 34 corresponds to the shape of the grooves 28 of the oxygen-containing gas flow field 26. The grooves 34a are connected to the coolant supply passage 22a and the coolant discharge passage 22b through an inlet buffer 36a and an outlet buffer 36b including bosses or the like, respectively.

A first seal member 40 is formed integrally on the surfaces 16a, 16b of the first metal separator 16, e.g., by injection molding around the outer end of the first metal separator 16. The first seal member 40 is made of seal material, cushion material or packing material such as EPDM (Ethylene Propylene Diene Monomer), NBR (Nitrile Butadiene Rubber), fluorocarbon rubber, silicone rubber, fluoro silicone rubber, butyl rubber (Isobutene-Isoprene Rubber), natural rubber, styrene rubber, chloroprene rubber, or acrylic rubber.

The first seal member 40 has a planar shape. As shown in FIG. 1, a first planar seal 40a is formed on the surface 16a. The first planar seal 40a prevents leakage of the oxygen-containing gas flowing between the oxygen-containing gas flow field 26 and the oxygen-containing gas supply passage 20a, and between the oxygen-containing gas flow field 26 and the oxygen-containing gas discharge passage 20b. As shown in FIG. 3, a second planar seal 40b is formed on the surface 16b. The second planar seal 40b prevents leakage of the coolant flowing between the coolant supply passage 22a and the coolant flow field 34, and between the coolant flow field 34 and the coolant discharge passage 22b. The second planar seal 40b is longer (wider) than the first planar seal 40a (see FIG. 2).

Figure 4:
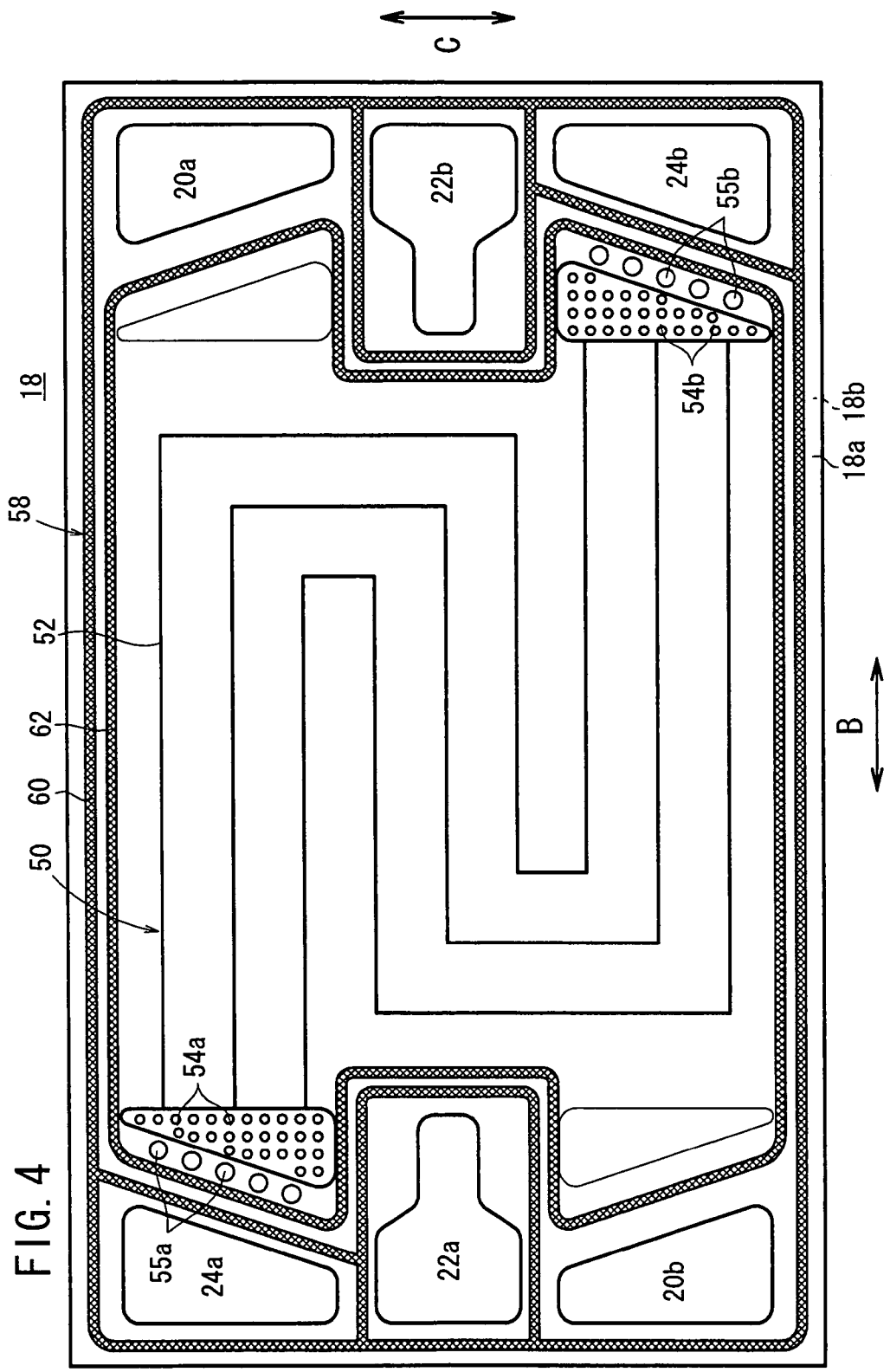
FIG. 4 is a view showing one surface of a second metal separator of the power generation cell.

As shown in FIG. 4, the second metal separator 18 has a fuel gas flow field 50 on its surface 18a facing the membrane electrode assembly 14 of the second metal separator 18. The second metal separator 18 is corrugated to define a plurality of grooves 52 of the fuel gas flow field 50. The grooves 52 extend in a serpentine pattern having two turn regions and three straight regions for allowing the fuel gas to flow back and forth in the direction indicated by the arrow B, and flow in the direction indicated by the arrow C. The fuel gas flow field 50 is connected to the fuel gas supply passage 24a on the surface 18b through an inlet buffer 54a and inlet through holes 55a, and connected to the fuel gas discharge passage 24b on the surface 18b through an outlet buffer 54b and outlet through holes 55b.

Figure 5:
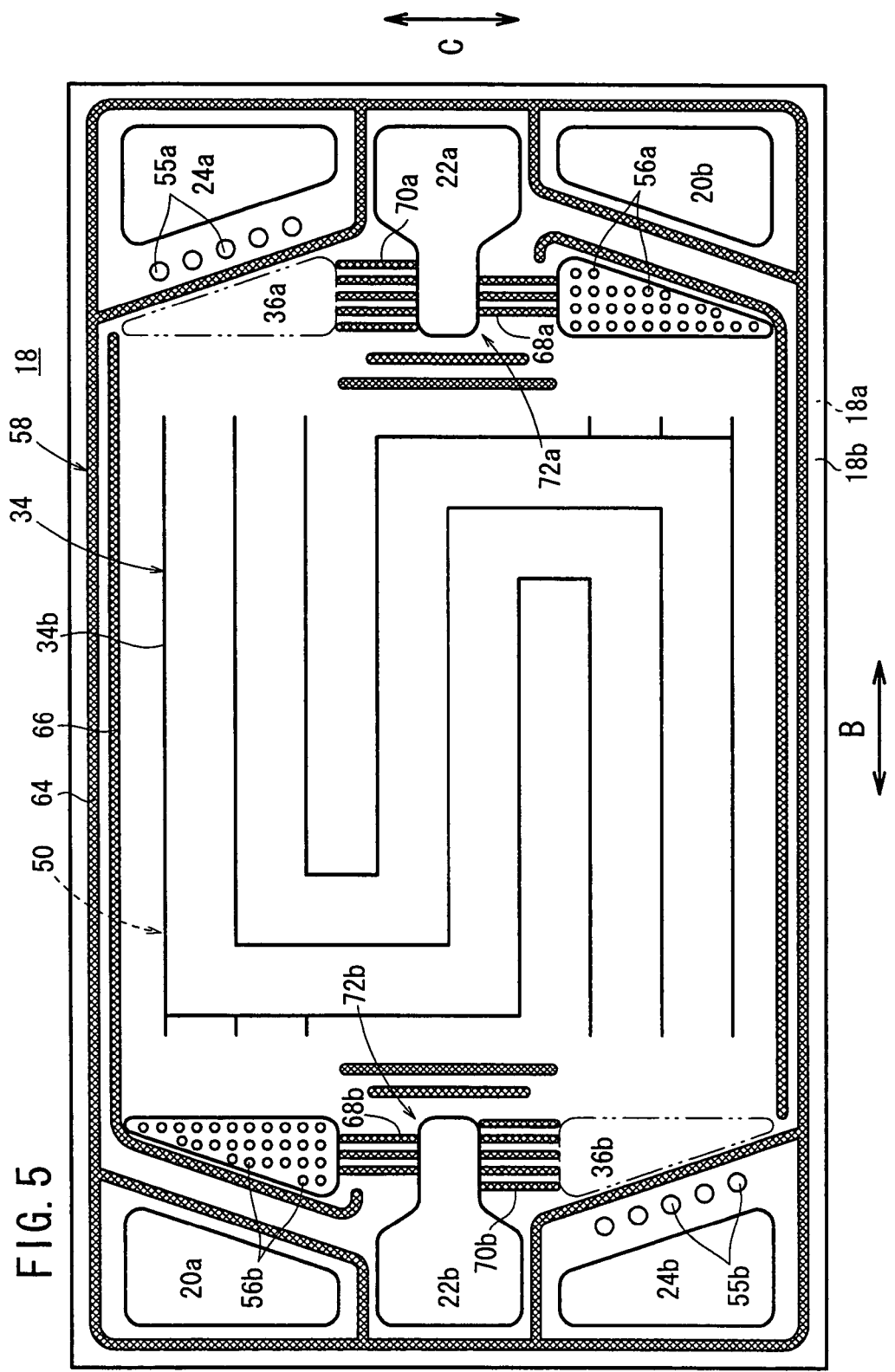
FIG. 5 is a view showing the other surface of the second metal separator.

As shown in FIGS. 1 and 5, a plurality of grooves 34b as part of the coolant flow field 34 are formed on the other surface 18b opposite to the surface 18a of the second metal separator 18. The shape of the grooves 34b of the coolant flow field 34 corresponds to the shape of the grooves 52 of the fuel gas flow field 50. The grooves 34b are connected to the coolant supply passage 22a through an inlet buffer 56a, and connected to the coolant discharge passage 22b through an outlet buffer 56b.

A second seal member 58 is formed integrally on the surfaces 18a, 18b of the second metal separator 18 around the outer end of the second metal separator 18. The material of the second seal member 58 is the same as the material of the first seal member 40. As shown in FIG. 4, the second seal member 58 includes an outer protrusion 60 and an inner protrusion 62 on the surface 18a of the second metal separator 18. The inner protrusion 62 is spaced inwardly from the outer protrusion 60 by a predetermined distance. The inner protrusion 62 contacts an outer marginal region of the solid polymer electrolyte membrane 80 to close the fuel gas flow field 50 (see FIG. 2).

As shown in FIG. 5, the second seal member 58 includes an outer protrusion 64 and an inner protrusion 66 on the surface 18b of the second metal separator 18. The inner protrusion 66 is spaced inwardly from the outer protrusion 64 by a predetermined distance. A plurality of, e.g., three ridge members 68a are formed integrally on the surface 18b of the second metal separator 18, between the coolant supply passage 22a and the inlet buffer 56a, and a plurality of, e.g., three ridge members 68b are formed integrally on the surface 18b of the second metal separator 18, between the coolant discharge passage 22b and the outlet buffer 56b.

Further, a plurality of, e.g., five ridge members 70a are formed integrally on the surface 18b, between the coolant supply passage 22a and the inlet buffer 36a of the first metal separator 16, and a plurality of, e.g., five ridge members 70b are formed integrally on the surface 18b, between the coolant discharge passage 22b and the outlet buffer 36b of the first metal separator 16. The ridge members 68a, 68b, 70a, 70b are part of the second seal member 58. Inlet connection groves 72a and outlet connection grooves 72b are formed when the ridge members 68a, 68b, 70a, 70b contact the first seal member 40 under pressure.

The coolant supply passage 22a and the coolant flow field 34 are connected through the inlet connection grooves 72a, and the coolant discharge passage 22b and the coolant flow field 34 are connected through the outlet connection grooves 72b.

Figure 6:
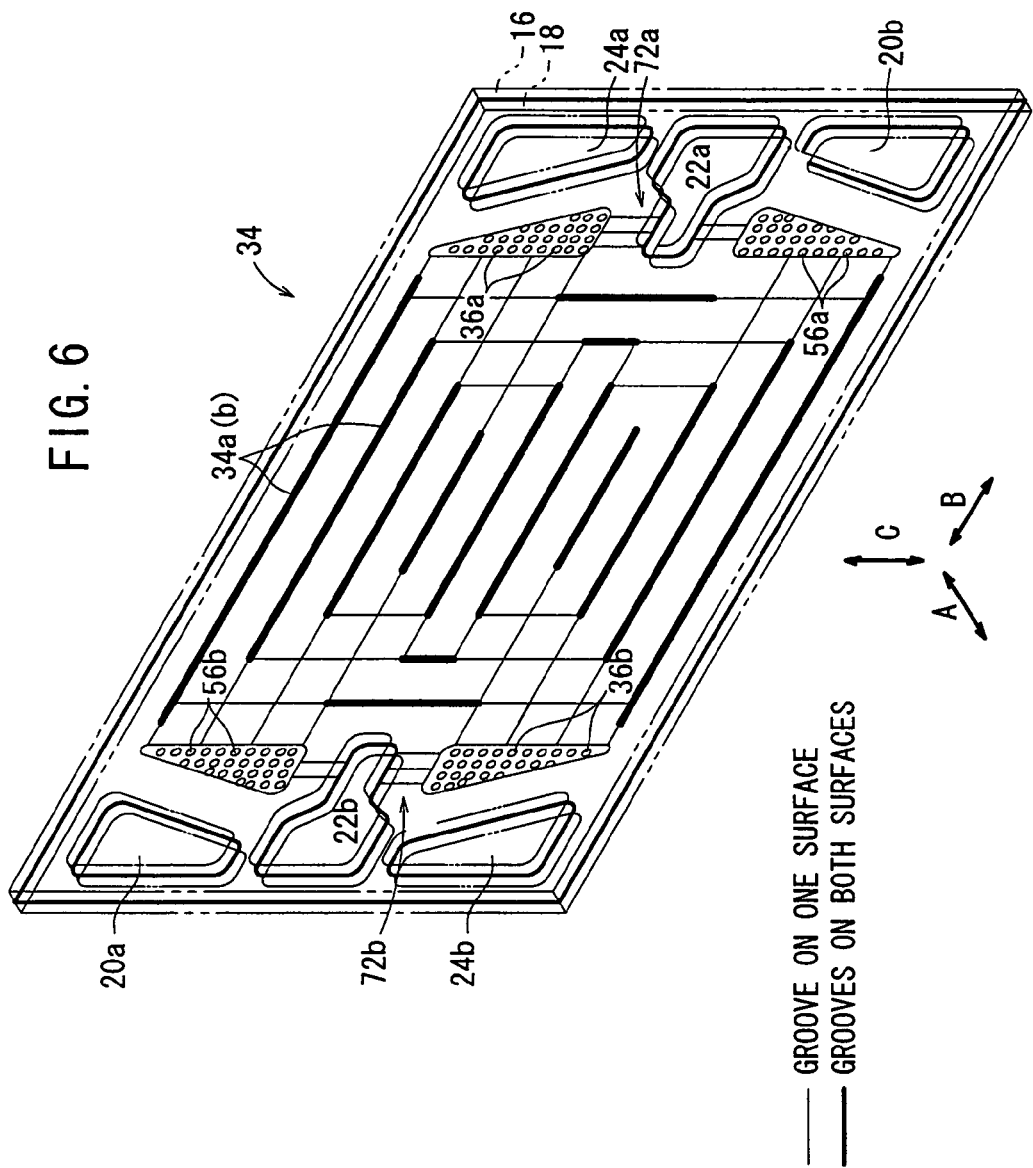
FIG. 6 is a perspective view showing a coolant flow field formed between the first and second metal separators.
Figure 7:
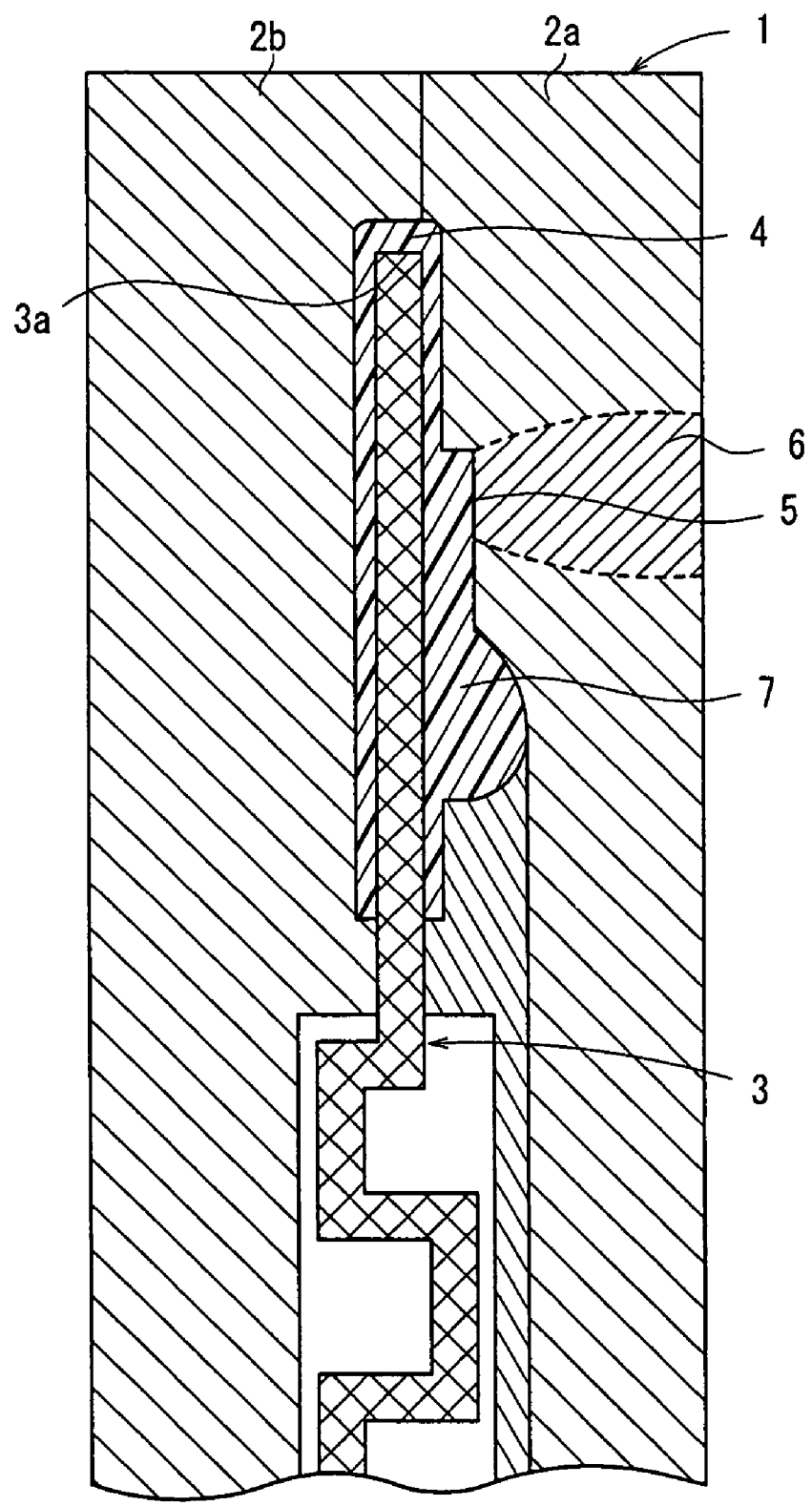
FIG. 7 is a view showing a conventional production method.

As shown in FIG. 6, the coolant flow field 34 is formed by the grooves 34a of the first metal separator 16 and the grooves 34b of the second metal separator 18 when the first metal separator 16 and the second metal separator 18 are stacked together. The inlet buffers 36a, 56a of the coolant flow field 34 are connected to the coolant supply passage 22a through the inlet connection grooves 72a, and the outlet buffers 36b, 56b of the coolant flow field 34 are connected to the coolant discharge passage 22b through the outlet connection grooves 72b.

As shown in FIG. 2, an outer curved portion or an outer bent portion defining an orifice 74 is formed in an outer marginal region of the first metal separator 16 for improving the rigidity. The thickness (dimension in the direction of the thickness of the first metal separator 16) H1 of the first seal member 40 in the area covering the outer curved portion or the outer bent portion defining the orifice 74 is larger than the thickness H2 in the area covering other portions, i.e., the area covering the flat portion. Further, the thickness H3 of the first seal member 40 in the area covering the end of the first metal separator 16 (dimension in the direction along the surface of the first metal separator 16) is larger than the thickness H2 in the area covering the other portions.

For example, if the thickness of the first metal separator 16 is in the range of 0.05 mm to 1.0 mm, the first seal member 40 has the thickness H1 in the range of 0.2 mm to 1.0 mm, the thickness H2 in the range of 0.1 mm to 0.4 mm, and the thickness H3 in the range of 0.2 mm to 1.0 mm.

Likewise, an outer curved portion or an outer bent portion defining an orifice 76 is formed in an outer marginal region of the second metal separator 18 for improving the rigidity. The thickness H1 of the second seal member 58 in the area covering the outer curved portion or the outer bent portion defining the orifice 76 is larger than the thickness H2 in the area covering the other portions. Further, the thickness H3 of the second seal member 58 in the area covering the end of the second metal separator 18 is larger than the thickness H2.

As shown in FIG. 1, at opposite ends of the membrane electrode assembly 14 in the direction directed by the arrow B, central portions of the membrane electrode assembly 14 are cut away inwardly. As shown in FIGS. 1 and 2, the membrane electrode assembly 14 comprises a cathode 82, an anode 84, and the solid polymer electrolyte membrane 80 interposed between the cathode 82 and the anode 84. The solid polymer electrolyte membrane 80 is formed by impregnating a thin membrane of perfluorosulfonic acid with water, for example. The surface area of the anode 84 is smaller than the surface area of the cathode 82.

Each of the cathode 82 and anode 84 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the cathode 82 and the electrode catalyst layer of the anode 84 are fixed to both surfaces of the solid polymer electrolyte membrane 80, respectively.

Next, operation of the fuel cell 10 will be described.

As shown in FIG. 1, a fuel gas such as a hydrogen-containing gas is supplied to the fuel gas supply passage 24a, an oxygen-containing gas is supplied to the oxygen-containing gas supply passage 20a, and a coolant such as pure water, or ethylene glycol is supplied to the coolant supply passage 22a.

Thus, as shown in FIGS. 1 and 4, the fuel gas from the fuel gas supply passage 24a moves from the surface 18b to the surface 18a through the inlet through holes 55a. Then, the fuel gas flows through the inlet buffer 54a, and flows into the fuel gas flow field 50 of the second metal separator 18. The fuel gas flows back and forth in the direction indicated by the arrow B, and is supplied to the anode 84 of the membrane electrode assembly 14.

As shown in FIG. 1, the oxygen-containing gas from the oxygen-containing gas supply passage 20a flows through the inlet buffer 32a, and flows into the oxygen-containing gas flow field 26 of the first metal separator 16. The oxygen-containing gas flows back and forth in the direction indicated by the arrow B, and is supplied to the cathode 82 of the membrane electrode assembly 14.

Thus, in the membrane electrode assembly 14, the fuel gas supplied to the anode 84 and the oxygen-containing gas supplied to the cathode 82 are consumed in the electrochemical reactions at catalyst layers of the anode 84 and the cathode 82 for generating electricity.

After the fuel gas is consumed at the anode 84, the fuel gas flows from the outlet buffer 54b toward the surface 18b through the outlet through holes 55b, and is discharged in the direction indicated by the arrow A along the fuel gas discharge passage 24b (see FIGS. 1 and 4). Likewise, after the oxygen-containing gas is consumed at the cathode 82, the oxygen-containing gas from the outlet buffer 32b is discharged in the direction indicated by the arrow A along the oxygen-containing gas discharge passage 20b (see FIG. 1).

Further, as shown in FIG. 6, the coolant supplied to the coolant supply passage 22a flows through the inlet connection grooves 72a, and flows into the coolant flow field 34 between the first and second metal separators 16, 18 through the inlet buffers 36a, 56a. After the coolant is used for cooling the membrane electrode assembly 14, the coolant from the outlet buffers 36b, 56b flows through the outlet connection grooves 72b, and is discharged into the coolant discharge passage 22b.

In the first metal separator 16, the portion defining the orifice 74, and portions such as the corrugated surface defining the oxygen-containing gas flow field 26 are fabricated by press forming. Dimensional variation occurs easily in the portions fabricated by press forming. For example, dimensional variation may occur in the portion defining the orifice 74.

In the embodiment of the present invention, the substantially frame shaped first seal member 40 is formed integrally around the outer end of the first metal separator 16. As shown in FIG. 2, the thickness H1 of the first seal member 40 in the area covering the portion defining the orifice 74 is larger than the thickness H2 in the area covering the other portions.

As described above, since the thickness of the first seal member 40 in the area covering the portion defining the orifice 74 is large, even if dimensional variation occurs in the portion defining the orifice 74, the metal portion (the portion defining the orifice 74) is not exposed undesirably to the outside from the first seal member 40. Thus, with the simple and economical structure of the first metal separator 16, insulation failure of the first metal separator 16 is prevented, and the desired power generation performance of the fuel cell 10 is maintained advantageously.

Further, dimensional variation occurs easily in the end of the first metal separator 16 which is fabricated by trimming. The thickness H3 of the first seal member 40 covering the end is larger than the thickness H2. Therefore, the end is not exposed to the outside.

Likewise, the outer curved portion or the outer bent portion defining the orifice 76 is formed in the outer marginal region of the second metal separator 18, and the thickness H1 of the second seal member 58 in the area covering the portion defining the orifice 76 is larger than the thickness H2 in the area covering the other portions. Therefore, the second seal member 58 reliably covers the portion defining the orifice 76 regardless of dimensional variation which may occur at the time of press forming, and insulation failure of the second metal separator 18 is prevented suitably.

Further, since the thickness H3 of the second seal member 58 in the area covering the end of the second metal separator 18 is larger than the thickness H2, the end of the second metal separator 18 is not exposed to the outside from the second seal member 58.

In the embodiment of the present invention, as an example, the first seal member 40 includes the first and second planar seals 40a, 40b formed on both surfaces 16a, 16b of the first metal separator 16. Alternatively, the first seal member 40 may include only the first planar seal 40a. In this case, the thickness H1 of the first planar seal 40a in the area covering the portion defining the orifice 74 is larger than the thickness H2 of the first planar seal 40a in the area covering the other portions.

While the invention has been particularly shown and described with reference to a preferred embodiment, it will be understood that variations and modifications can be effected thereto by those skilled in the art without departing from the spirit and scope of the invention as defined by the appended claims.

What is claimed is:

1. A fuel cell formed by stacking a membrane electrode assembly and a metal separator, said membrane electrode assembly including a pair of electrodes and an electrolyte membrane interposed between said electrodes, said metal separator comprising:

a metal plate having at an outer end thereof an outer curved transitional portion and a relatively flat tip portion extending outwardly from the outer curved transitional portion to form the outer end of the metal plate; and a seal member covering both the outer curved transitional portion and the relatively flat tip portion, wherein the thickness of said seal member in an area covering said outer curved transitional portion of said metal plate is larger than the thickness of said seal member in an area covering other portions of said metal plate.

2. A fuel cell according to claim 1, wherein the thickness of said seal member is the dimension in the direction of the thickness of said metal plate.

3. A fuel cell according to claim 1, wherein said seal member covers an end of said metal plate; and the thickness of said seal member in an area covering said end of said metal plate is larger than the thickness of said seal member in the area covering the other portions of said metal plate.

4. A fuel cell according to claim 3, wherein the thickness of said seal member covering said end of said metal plate is the dimension in the direction along said plate surface of said metal plate.

* * * * *